(12) United States Patent
Beers et al.

(10) Patent No.: US 8,783,952 B1
(45) Date of Patent: Jul. 22, 2014

(54) JOURNAL BEARING SLEEVE

(71) Applicant: Hamilton Sundstrand Corporation, Windsor Locks, CT (US)

(72) Inventors: Craig M. Beers, Wethersfield, CT (US); Darryl A. Colson, West Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/855,890

(22) Filed: Apr. 3, 2013

(51) Int. Cl.
*F16C 32/06* (2006.01)

(52) U.S. Cl.
USPC ........................................... 384/103

(58) Field of Classification Search
USPC ................................. 384/103–106
See application file for complete search history.

(56) References Cited

U.S. PATENT DOCUMENTS

| | | | |
|---|---|---|---|
| 1,743,548 A | 1/1930 | Howes | |
| 4,274,683 A | 6/1981 | Gray et al. | |
| 5,201,585 A | 4/1993 | Gans et al. | |
| 5,498,083 A * | 3/1996 | Brown | 384/106 |
| 6,257,003 B1 | 7/2001 | Hipsky | |
| 6,615,606 B2 | 9/2003 | Zywiak | |
| 7,402,020 B2 | 7/2008 | Beers et al. | |
| 7,648,279 B2 * | 1/2010 | Struziak et al. | 384/103 |
| 7,757,502 B2 | 7/2010 | Merritt et al. | |
| 2005/0185865 A1 * | 8/2005 | Agrawal | 384/106 |

FOREIGN PATENT DOCUMENTS

GB 1428733 3/1976

* cited by examiner

*Primary Examiner* — Phillip A Johnson
(74) *Attorney, Agent, or Firm* — Carlson, Gaskey & Olds, P.C.

(57) ABSTRACT

A journal bearing including a cylindrical sleeve structure has an anti-rotation slot for receiving a portion of a foil layer. The anti-rotation slot extends radially into the cylindrical sleeve structure, relative to an axis defined by the cylindrical sleeve structure, from said inner diameter surface.

18 Claims, 3 Drawing Sheets

JOURNAL BEARING SLEEVE

TECHNICAL FIELD

The present disclosure relates generally to journal bearing assemblies for air machines, and more specifically to journal bearing sleeves for use in the same.

BACKGROUND OF THE INVENTION

Commercial aircraft typically include air machines such as ram air fans, air cycle machines, and cabin air compressors. The air machines utilize rotating shafts to drive the air machine by imparting a rotation of the shaft onto a portion of the components in the air machine. In order to support and guide the rotating shaft, journal bearings are placed on the shaft and connected to the air machine.

A typical journal bearing includes a cylindrical sleeve that fits around the shaft and is axially aligned with the shaft. Between the sleeve and the shaft is a fluid, such as air or another lubricant. The fluid creates a minimal friction rotating environment for the shaft.

SUMMARY OF THE INVENTION

Disclosed is a journal bearing sleeve including a cylindrical sleeve structure having an inner diameter surface and an outer diameter surface, wherein the cylindrical sleeve structure defines an axis, an anti-rotation slot extends radially into the cylindrical sleeve structure, relative to the axis, from the inner diameter surface, and the cylindrical sleeve structure has a first axial end and a second axial end, and the outer diameter surface is chamfered at the second axial end.

Also disclosed is a journal bearing assembly including a cylindrical bearing sleeve having a cylindrical sleeve structure having an inner diameter surface and an outer diameter surface, wherein the cylindrical sleeve structure defines an axis, an anti-rotation slot extends radially into the cylindrical sleeve structure, relative to the axis, from the inner diameter surface, and the cylindrical sleeve structure has a first axial end and a second axial end, and the outer diameter surface is chamfered at the second axial end, a foil layer adjacent the inner diameter surface, wherein the foil layer has at least a first waved foil sub-layer and a second smooth foil sub-layer, and wherein a portion of the foil layer is received in the anti-rotation slot, thereby preventing the foil layer from rotating.

Also disclosed is a method of installing a journal bearing, including the steps of positioning a foil layer adjacent an inner surface of a journal bearing sleeve such that a portion of the foil layer is received in an anti-rotation slot of the journal bearing sleeve and receiving a shaft in an opening of the journal bearing defined by an inner diameter of the journal bearing sleeve, and wherein the shaft is sized to fit the opening.

These and other features of the present invention can be best understood from the following specification and drawings, the following of which is a brief description.

BRIEF DESCRIPTION OF THE DRAWINGS

FIG. 1b illustrates an end view of the journal bearing assembly of FIG. 1a.

DETAILED DESCRIPTION OF AN EMBODIMENT

Figure 1A:
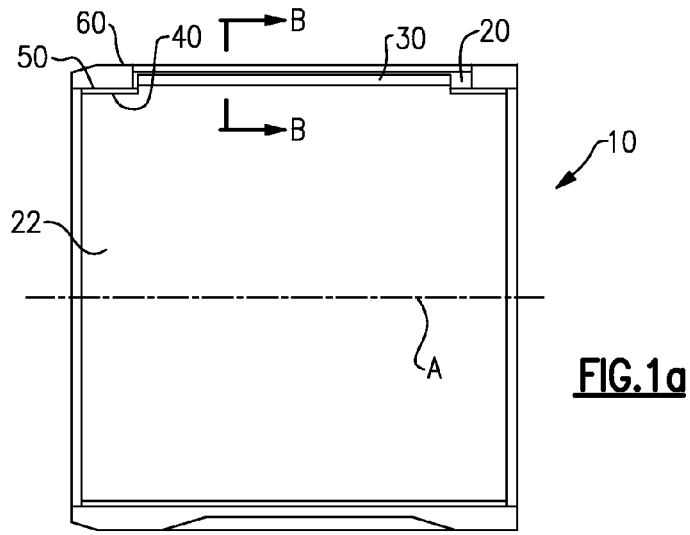
FIG. 1a illustrates a cross sectional side view of a journal bearing assembly.
Figure 1B:
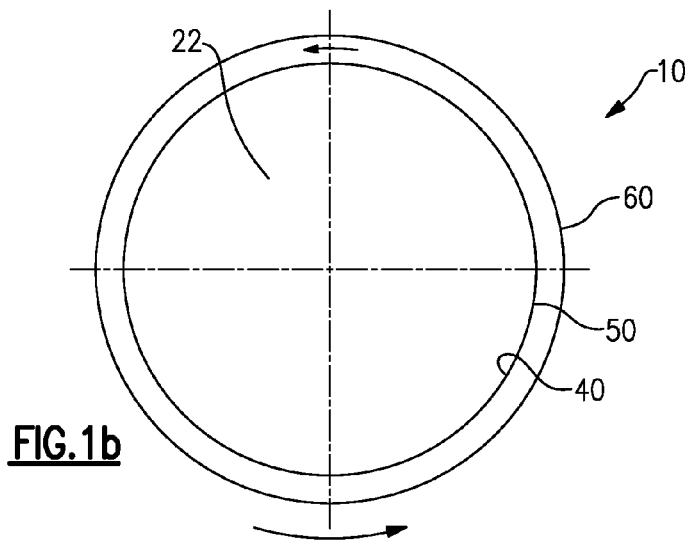

FIGS. 1a and 1b illustrate a journal bearing assembly 10 for use in a air machine, such as an air cycle machine, a ram air fan, or a cabin air compressor for a commercial aircraft. FIG. 1a illustrates a cross sectional side view of the journal bearing assembly 10 and FIG. 1b illustrates an end view of the journal bearing assembly 10. The journal bearing assembly 10 includes a cylindrical shaped journal bearing sleeve 20 that defines an axis A. In an assembled air machine, a shaft is inserted into an opening 22 defined by the journal bearing sleeve, and is aligned with axis the A. A foil layer 40 is disposed between the shaft and the journal bearing sleeve 20 and aids in the creation of an air layer between the shaft and the foil layer 40 when the shaft is rotating. The journal bearing sleeve 20 has an anti-rotation slot 30 disposed on an inner diameter surface 50. The anti-rotation slot 30 extends radially outward, relative to the axis A, toward an outer diameter surface 60 of the journal bearing sleeve 20. The anti-rotation slot 30 is aligned with the axis A and receives a portion of the foil layer 40, thereby preventing the foil layer 40 from rotating along with the shaft. In one example, one end of the journal bearing sleeve 20 includes a chamfered outer diameter portion on the outer diameter surface 60.

Figure 2:
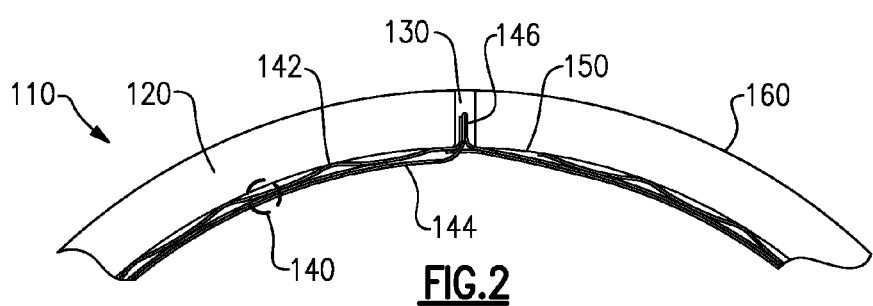
FIG. 2 illustrates a partial cross sectional view of the journal bearing assembly of FIGS. 1a and 1b along view line B-B.

FIG. 2 illustrates a partial cross sectional end view of a journal bearing assembly 110 along view lines B-B from FIG. 1a. As with the journal bearing assembly 10 of FIGS. 1a and 1b, a foil layer 140 is disposed adjacent to an inner diameter surface 150 of the journal bearing sleeve 120. The foil layer 140 includes a radially inner smooth foil sub-layer 144 and a radially outer waved foil sub-layer 142. Each of the foil sub layers 142, 144 includes an anti-rotation portion 146 that extends into an anti-rotation slot 130 disposed in the journal bearing sleeve 120. The anti-rotation portion 146 prevents the foil layer 140 from rotating along with the shaft during operation of the air machine.

The combination of the waved foil layer 142 and the smooth foil layer 144 allows for the creation of the air layer between the foil layer 140 and the shaft while the shaft is rotating. The air layer acts as a lubricant and allows the shaft to rotate in a minimal friction environment, while still allowing the journal bearing assembly 110 to support and guide the rotating shaft.

As with the example of FIGS. 1a and 1b, the journal bearing sleeve 120 of FIG. 2 has an inner diameter surface 150 and an outer diameter surface 160, and the anti-rotation slot 130 is a slot on the inner diameter surface 150 of journal bearing sleeve 120 extending radially outward from the axis defined by the journal bearing sleeve 120 toward the outer diameter surface 160. In one example, the anti-rotation slot 130 extends only partially into the journal bearing sleeve 10, thereby defining a portion of the journal bearing sleeve 120 having a smaller radial thickness than the remainder of the journal bearing sleeve 120.

Figure 3:
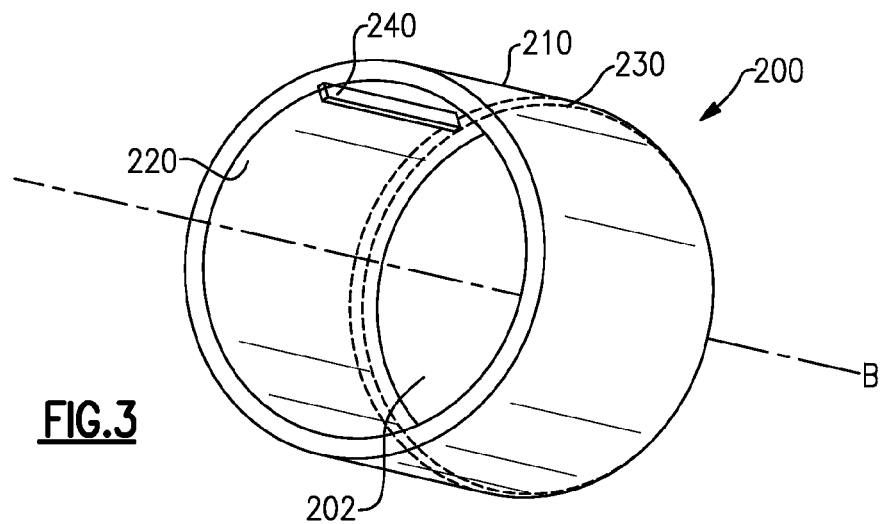
FIG. 3 illustrates an isometric view of a journal bearing sleeve.

FIG. 3 illustrates a three dimensional isometric view of a journal bearing sleeve 200 that can be utilized in a journal bearing assembly, such as the journal bearing assemblies 10, 110 illustrated in FIGS. 1a, 1b and 2. The journal bearing sleeve 200 is a cylindrical component having an opening 202 passing through the journal bearing sleeve 200 and defining an axis B. The journal bearing sleeve 200 has an inner diameter surface 220 on the inside of the journal bearing sleeve 200 and an outer diameter surface 210 on the outside of the journal bearing sleeve 200.

A single anti-rotation slot 240 is located in the journal bearing sleeve 200 and extends from the inner diameter surface 220 radially outward toward the outer diameter surface 210 such that the radius of the inner diameter surface 220 in the anti-rotation slot 240 is larger than the radius of the inner diameter surface 220 elsewhere. Alternately, the anti-rotation slot 240 can be described as a portion of the journal bearing sleeve 200 where a difference between the outer diameter (a diameter defined by the outer surface 210 of the journal bearing sleeve 200) and the inner diameter (a diameter defined by the inner surface 220 of the journal bearing sleeve 200) is low relative to a remainder of the journal bearing sleeve 200. This difference is referred to as the radial thickness of the journal bearing sleeve 200.

The anti-rotation slot 240 is aligned with the axis B, and extends only a portion of the axial length of the journal bearing sleeve 200. The anti-rotation slot 240 is offset from each axial end of the journal bearing sleeve 200. In one example, the anti-rotation slot 240 is not axially centered on the inner surface 220 of the journal bearing sleeve 200.

In one example, the journal bearing sleeve 200 includes a chamfered portion 230 on one axial end.

Figure 4:
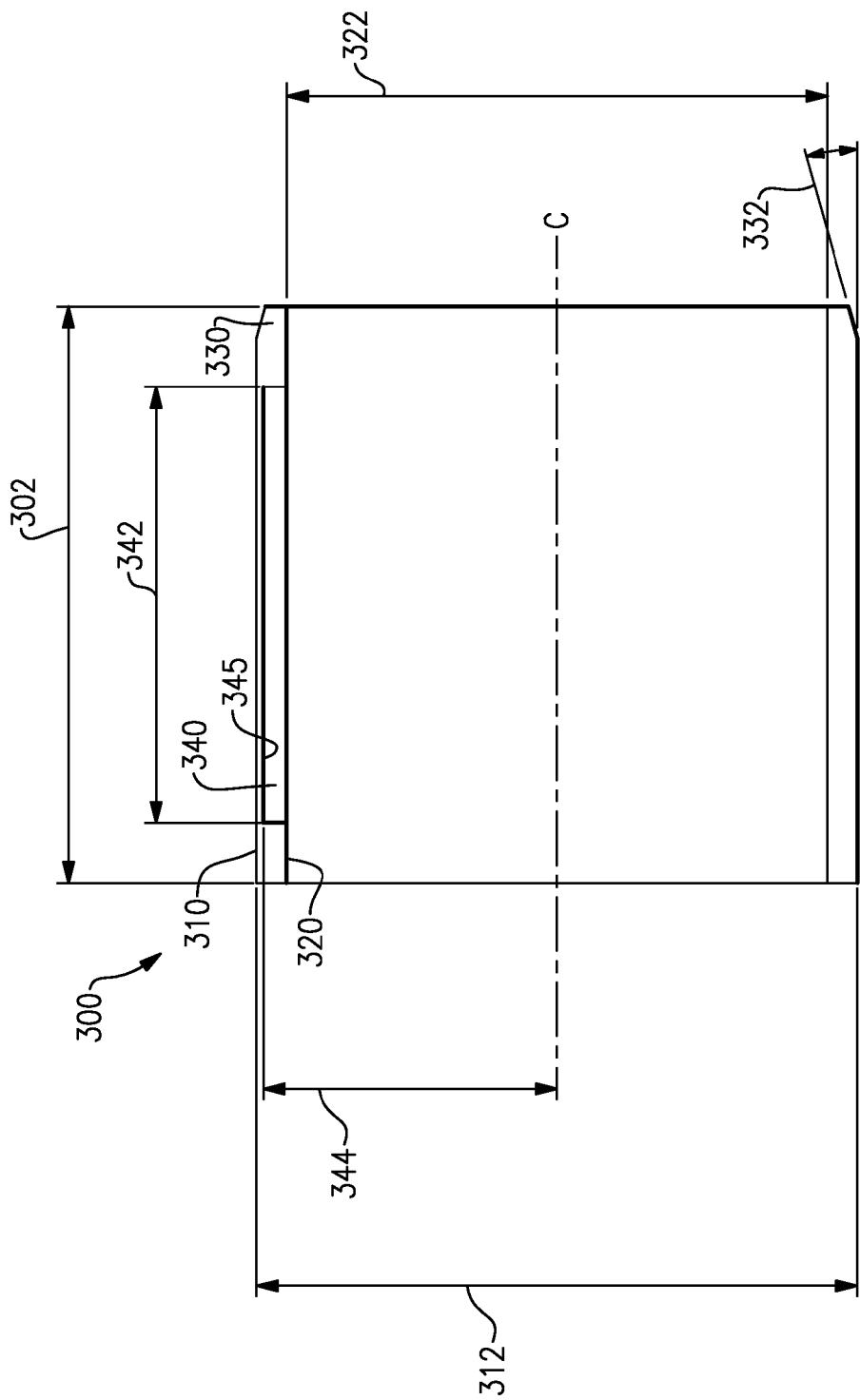
FIG. 4 illustrates a cross sectional side view of a journal bearing sleeve.

FIG. 4 illustrates a cross sectional view along an axis C of an example journal bearing sleeve 300. The example journal bearing sleeve 300 includes an inner diameter surface 320 defining a circular cross section and having an inner diameter 322 in the range of 2.0235-2.0245 inches (5.1396-5.1423 centimeters). The example journal bearing sleeve 300 has an outer diameter surface 310 defining a circular cross section having an outer diameter 312 in the range of 2.2495-2.2505 inches (5.7137-5.71627 centimeters). In one example a ratio of the outer diameter 312 to the inner diameter 322 is in the range of 2.2495:2.0245-2.2505:2.0235. In one example, this range of ratios defines the thickness of the journal bearing sleeve 300 at all locations with the exception of an anti-rotation slot portion 340 and a chamfered portion 330.

The chamfered portion 330 has an outer diameter surface 310 that is angled toward the axis C. In one example, the angle of the outer diameter surface 310 at the chamfered portion 330, relative to the axis C, is in the range of 14-16 degrees.

In one example, the journal bearing sleeve 300 has an axial length 302 in the range of 2.150-2.160 inches (5.461-5.487 centimeters). In one example, the anti-rotation slot 340 has an axial anti-rotation slot length 342 in the range of 1.630-1.640 inches (4.1402-4.1656 centimeters). In one example, a ratio of the journal bearing sleeve length 302 to the anti-rotation slot sleeve length 342 is in the range of 1.640:2.150-1.630:2.160 inches.

The anti-rotation slot 340 has a depth 344 defined as a radial distance from the axis C to an inner diameter surface 345 of the anti-rotation slot 340. In one example, the anti-rotation slot depth 340 is in the range of 1.095-1.105 inches (2.781-2.807 centimeters).

Figure 5:
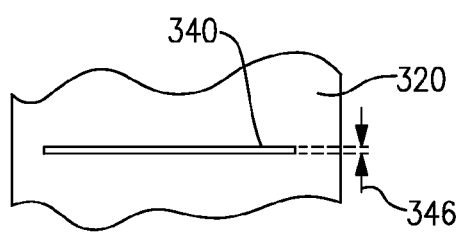
FIG. 5 illustrates a partial radially outward facing view of an interior surface of the journal bearing sleeve of FIG. 3 along view line F-F.
Figure 6:
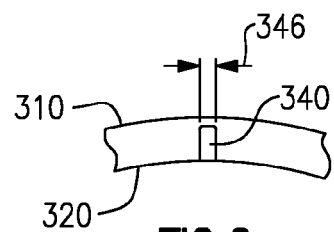
FIG. 6 illustrates a partial cross sectional end view of the journal bearing sleeve of FIG. 3 along view line D-D.

With regards to the anti-rotation slot 340, and with continued reference to FIG. 4, FIG. 5 illustrates a partial radially outward facing view of an interior surface of the journal bearing sleeve 300 of FIG. 3 along view line F-F. Similarly, FIG. 6 illustrates a partial cross sectional view of the journal bearing sleeve 300 of FIG. 3 along view line D-D. As can be seen in FIGS. 5 and 6, the anti-rotation slot 340 has a width 346 defined as the shortest distance between two facing, axially aligned, walls of the anti-rotation slot 340. In one example, the anti-rotation slot width 346 is within the range of 0.036-0.046 inches (0.0914-0.1169 centimeters).

In one example, the anti-rotation slot 340 has a width 346 to axial length 342 ratio in the range of 0.046:1.630-0.036:1.640 inches. In one example, the anti-rotation slot 340 has a width 346 to anti-rotation slot depth 344 ratio in the range of 0.046:1.095-0.036:1.105.

In one example, the ratio of the inner diameter 322 to anti-rotation slot length 342 is in the range of 2.0235:1.640-2.0245:1. In one example, the ratio of the outer diameter 312 to the anti-rotation slot length 342 is in the range of 2.2495:1.640-2.2505:1.630.

While the above described dimensions and ratios are listed with regards to multiple example journal bearing sleeves, it is understood that any combination of the above lengths and ratios can be utilized in the design of a single journal bearing sleeve and still fall within this disclosure.

Figure 7:
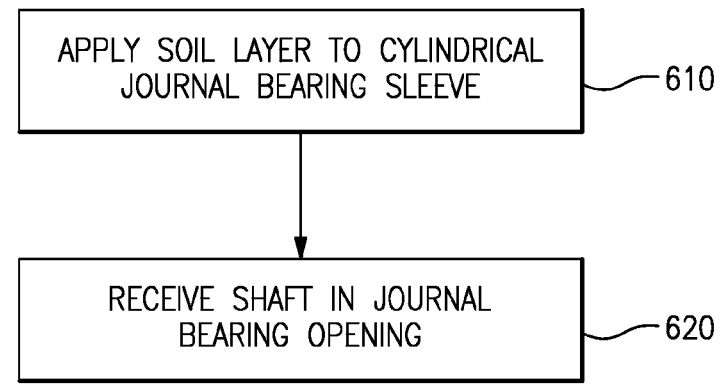
FIG. 7 illustrates an method of installing a journal bearing.

FIG. 7 describes a method for installing a journal bearing according to the above description in an air machine. Initially, a foil layer is applied to the inner diameter surface of a cylindrical journal bearing sleeve in an "apply foil layer to cylindrical journal bearing sleeve" 610. During application of the foil layer, a portion of the foil layer is received within an anti-rotation slot in the journal bearing sleeve, thereby preventing the foil from rotating along with a shaft. Once the foil layer is applied, the journal bearing sleeve is slid onto a shaft in a "receive shaft in journal bearing" step 620. The particular ranges and rations described above, alone or in combination, provide an improved bearing support structure, minimize journal bearing sleeve deflections, and increase the robustness of a system including the journal bearing following a failure of the journal bearing.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A journal bearing sleeve comprising:
    a cylindrical sleeve structure having an inner diameter surface and an outer diameter surface, wherein said cylindrical sleeve structure defines an axis;
    an anti-rotation slot extending radially into said cylindrical sleeve structure, relative to said axis, from said inner diameter surface;
    said cylindrical sleeve structure has a first axial end and a second axial end, and said outer diameter surface is chamfered at said second axial end; and
    wherein a ratio of an inner diameter of said cylindrical sleeve structure to an axial slot length of said anti-rotation slot is in the range of 2.0245:1.630-2.0235:1.640.

2. The journal bearing sleeve of claim 1, wherein said anti-rotation slot has two facing axially aligned walls and a width defined as the shortest distance between said facing axially aligned walls, said width being in the range of 0.036-0.046 inches (0.0914-0.1169 centimeters).

3. The journal bearing sleeve of claim 1, wherein said anti-rotation slot has an axial length in the range of 1.630-1.640 inches (4.1402-4.1656 centimeters).

4. The journal bearing sleeve of claim 1, wherein said cylindrical sleeve structure has an axial sleeve length in the range of 2.150-2.160 inches (5.461-5.487 centimeters).

5. The journal bearing sleeve of claim 1, wherein said cylindrical sleeve structure has an outer diameter in the range of 2.2495-2.2505 inches (5.7137-5.71627 centimeters).

6. The journal bearing sleeve of claim 1, wherein said cylindrical sleeve structure has an inner diameter radius in the range of 2.0235-2.0245 inches (5.1396-5.1423 centimeters).

7. The journal bearing sleeve of claim 1, wherein a ratio of an outer diameter of the cylindrical sleeve structure to an inner diameter of the cylindrical sleeve structure is in the range of 2.2495:2.0245-2.2505:2.0235.

8. The journal bearing sleeve of claim 1, wherein a ratio of an outer diameter of said cylindrical sleeve structure to an axial slot length of said anti-rotation slot is in the range of 2.2505:1.630-2.2495:1.640.

9. The journal bearing sleeve of claim 1, wherein a ratio of an axial slot length of said anti-rotation slot to a radial anti-rotation slot depth of said anti-rotation slot is in the range of 1.630:1.105-1.640:1.095.

10. The journal bearing sleeve of claim 1, wherein an anti-rotation slot width to a radial anti-rotation slot depth ratio in the range of 0.046:1.095-0.036:1.105.

11. The journal bearing sleeve of claim 1, wherein said anti-rotation slot is not axially centered on said cylindrical sleeve structure.

12. A journal bearing assembly comprising:
a cylindrical bearing sleeve having a cylindrical sleeve structure with an inner diameter surface and an outer diameter surface, wherein said cylindrical sleeve structure defines an axis, an anti-rotation slot extending radially into said cylindrical sleeve structure, relative to said axis, from said inner diameter surface, and said cylindrical sleeve structure has a first axial end and a second axial end, and said outer diameter surface is chamfered at said second axial end;
a foil layer adjacent said inner diameter surface, wherein said foil layer has at least a first waved foil sub-layer and a second smooth foil sub-layer, and wherein a portion of said foil layer is received in said anti-rotation slot, thereby preventing said foil layer from rotating; and
wherein a ratio of an outer diameter of said cylindrical sleeve structure to an axial slot length of said anti-rotation slot is in the range of 2.2505:1.630-2.2495:1.640.

13. The journal bearing sleeve of claim 12, wherein a ratio of an outer diameter of the cylindrical sleeve structure to an inner diameter of the cylindrical sleeve structure is in the range of 2.2495:2.0245-2.2505:2.0235.

14. The journal bearing sleeve of claim 12, wherein a ratio of an inner diameter of said cylindrical sleeve structure to an axial slot length of said anti-rotation slot is in the range of 2.0245:1.630-2.0235:1.640.

15. The journal bearing sleeve of claim 12, wherein a ratio of an axial slot length of said anti-rotation slot to a radial anti-rotation slot depth of said anti-rotation slot is in the range of 1.630:1.105-1.640:1.095.

16. The journal bearing sleeve of claim 12, wherein an anti-rotation slot width to a radial anti-rotation slot depth ratio in the range of 0.046:1.095-0.036:1.105.

17. A method of installing a journal bearing, comprising the steps of:
positioning a foil layer adjacent an inner surface of a journal bearing sleeve such that a portion of said foil layer is received in an anti-rotation slot of said journal bearing sleeve; and
receiving a shaft in an opening of said journal bearing defined by an inner diameter of said journal bearing sleeve, wherein said shaft is sized to fit said opening, and wherein a ratio of an axial slot length of said anti-rotation slot to a radial anti-rotation slot depth of said anti-rotation slot is in the range of 1.630:1.105-1.640:1.095.

18. The method of claim 17, wherein said step of positioning a foil layer adjacent an inner surface of a journal bearing sleeve such that a portion of said foil layer is received in an anti-rotation slot of said journal bearing sleeve comprises positioning a first waved foil sub-layer immediately adjacent said inner diameter surface and a second smooth foil sub-layer adjacent said first waved foil sub-layer.

* * * * *